(12) United States Patent
Moriya

(10) Patent No.: US 12,363,239 B2
(45) Date of Patent: Jul. 15, 2025

(54) IMAGE FORMING APPARATUS FOR PRINTING FACSIMILE DATA, METHOD FOR CONTROLLING THE SAME, AND STORAGE MEDIUM

(71) Applicant: CANON KABUSHIKI KAISHA, Tokyo (JP)

(72) Inventor: Akihiro Moriya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/479,608

(22) Filed: Oct. 2, 2023

(65) Prior Publication Data

US 2024/0114102 A1 Apr. 4, 2024

(30) Foreign Application Priority Data

Oct. 3, 2022 (JP) ................. 2022-159276

(51) Int. Cl.
*H04N 1/32* (2006.01)
*H04N 1/00* (2006.01)

(52) U.S. Cl.
CPC ..... *H04N 1/32128* (2013.01); *H04N 1/00214* (2013.01); *H04N 1/00331* (2013.01)

(58) Field of Classification Search
None
See application file for complete search history.

(56) References Cited

U.S. PATENT DOCUMENTS

| 11,528,374 | B2 | 12/2022 | Ikeda et al. | |
| 2008/0062472 | A1* | 3/2008 | Garg | G06Q 10/0633 358/402 |
| 2016/0150120 | A1* | 5/2016 | Inoue | H04N 1/32096 358/440 |
| 2020/0159479 | A1* | 5/2020 | Yoshida | G06F 3/1279 |
| 2020/0382662 | A1* | 12/2020 | Ikeda | G06F 3/1267 |

FOREIGN PATENT DOCUMENTS

JP 2020198473 A 12/2020

* cited by examiner

*Primary Examiner* — Miya J Cato
(74) *Attorney, Agent, or Firm* — Canon U.S.A., Inc. IP Division

(57) ABSTRACT

An image forming apparatus includes a network interface unit configured to receive image data from an external apparatus, a printing unit configured to form an image on a sheet based on the image data received by the network interface unit, a display device configured to display an object corresponding to a type of the image data, an operation unit configured to receive a selection of the object displayed by the display device, and at least one processor and at least one memory that are configured to, based on the selection of the object, control the printing unit to form an image on a sheet based on image data corresponding to the type corresponding to the object out of the image data received by the network interface unit.

8 Claims, 14 Drawing Sheets

IMAGE FORMING APPARATUS FOR PRINTING FACSIMILE DATA, METHOD FOR CONTROLLING THE SAME, AND STORAGE MEDIUM

BACKGROUND

Field of the Disclosure

The present disclosure relates to an image forming apparatus, a method for controlling the image forming apparatus, and a storage medium.

Description of the Related Art

When dispensing reservations, orders are often sent to dispensing pharmacies from hospitals and patients by fax. In some cases, a dispensing pharmacy receives in memory a fax image sent from a hospital, checks the received image (image preview), and determines whether printing of the fax document is required. However, it takes time and effort for the dispensing pharmacy to check all of the received fax images, and check delay can affect a dispensing timing. A dispensing start delay can cause the delivery of medicines to be delayed.

Japanese Patent Application Laid-Open No. 2020-198473 discusses a technique for collectively printing images sent from a specific transmission source but does not consider a document type. Japanese Patent Application Laid-Open No. 2020-198473 discusses a technique for collectively printing only image data sent from a specific transmission source out of the fax jobs received in memory. This enables printing only fax reception images sent from a specific hospital.

However, the technique discussed in Japanese Patent Application Laid-Open No. 2020-198473 does not collectively print images of a specific type.

SUMMARY

However, there are some cases where, desirably, documents, such as orders (e.g., prescriptions), be collectively printed in dispensing reservation.

According to an aspect of the present disclosure, an image forming apparatus includes a network interface unit configured to receive image data from an external apparatus, a printing unit configured to form an image on a sheet based on the image data received by the network interface unit, a display device configured to display an object corresponding to a type of the image data, an operation unit configured to receive a selection of the object displayed by the display device, and at least one processor and at least one memory that are configured to, based on the selection of the object, control the printing unit to form an image on a sheet based on image data corresponding to the type corresponding to the object out of the image data received by the network interface unit.

Further features of various embodiments will become apparent from the following description of exemplary embodiments with reference to the attached drawings.

DESCRIPTION OF THE EMBODIMENTS

Some exemplary embodiments of the present disclosure will be described below with reference to the accompanying drawings. The following exemplary embodiments do not limit every embodiment within the scope of the appended claims. Not all of the combinations of the features described in the exemplary embodiments are used for the solution for every embodiment.

A first exemplary embodiment of the present disclosure will be described below.

Figure 1:
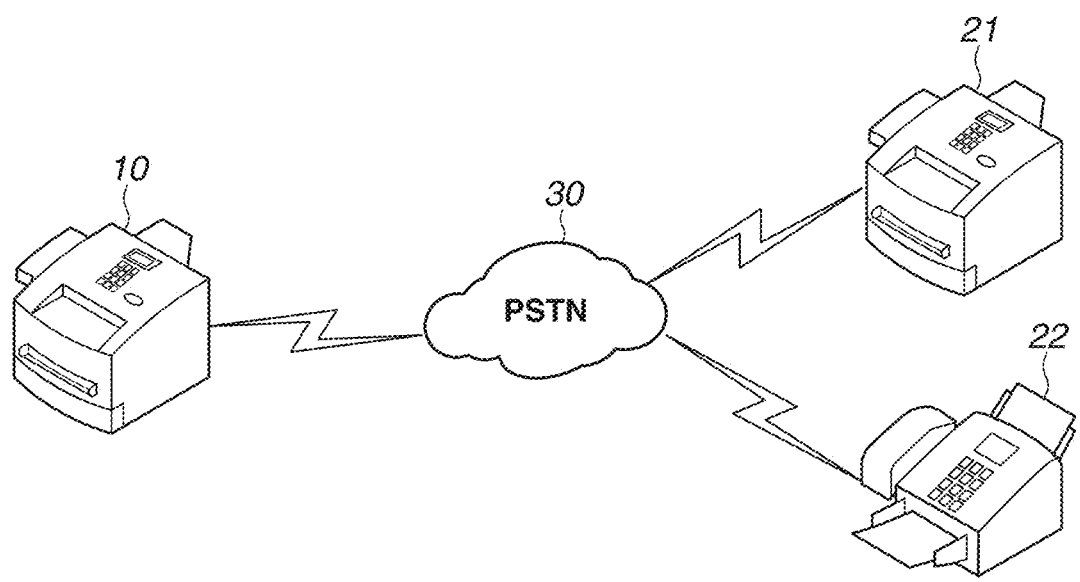
FIG. 1 illustrates an example of the configuration of an image data transmission and reception system.

FIG. 1 illustrates an example of the configuration of an image data transmission and reception system. A multi-function peripheral (MFP) 10, as an example of an image forming apparatus, can communicate with an MFP 21 and a facsimile (fax) 22, as external apparatuses, via a public switched telephone network (PSTN) 30.

The MFP 10 can communicate with the MFP 21 and the fax 22 through fax communication. As described below, the MFP 10 receives fax data (image and document data) sent from the MFP 21 and fax 22 and prints images on paper based on the received fax data.

Figure 2:
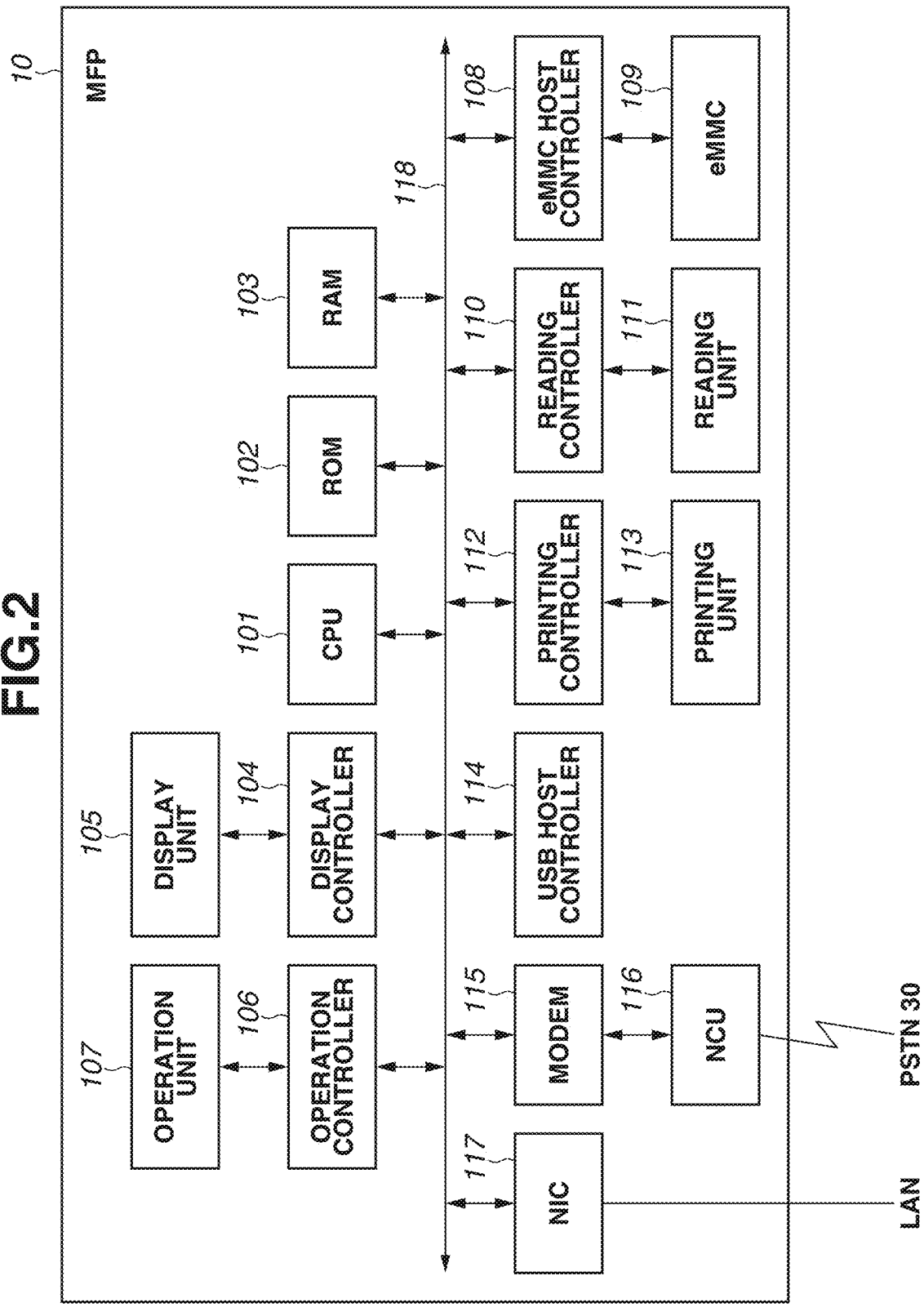
FIG. 2 illustrates an example of the hardware configuration of a multi-function peripheral (MFP).

FIG. 2 illustrates an example of a hardware configuration of the MFP 10. The MFP 21 also has a similar configuration as that of the MFP 10.

The MFP 10 includes a central processing unit (CPU) 101, a read only memory (ROM) 102, a random access memory (RAM) 103, a display controller 104, a display unit 105, an operation controller 106, and an operation unit 107. The MFP 10 includes an embedded Multi Media Card (eMMC) host controller 108, an eMMC 109, a reading controller 110, a reading unit 111, a printing controller 112, and a printing unit 113. The MFP 10 further includes a Universal Serial Bus (USB) host controller 114, a modulator-demodulator (MODEM) 115, a network control unit (NCU) 116, and a Network Interface Card (NIC) 117.

The CPU 101 carries out each function of the MFP 10 by controlling various hardware components 102 to 117 included in the MFP 10 via a system bus 118. When power is supplied, the CPU 101 runs a boot program stored in the ROM 102. The boot program ordinarily loads a main program stored in a specific region of the eMMC 109 into the RAM 103 and then transfers control to the head of the loaded main program.

The ROM 102 stores programs and various kinds of data to be used by the CPU 101. The RAM 103 functions as a place for loading the main program and a work area of the main program.

The display controller 104 controls drawing processing for the display unit 105. The display unit 105 is a full bitmap liquid crystal display (LCD) with the Wide Video Graphics Array (WVGA) size. Meanwhile, the operation controller 106 controls inputs from the operation unit 107. The operation unit 107, which provides a user interface for using the MFP 10, receives operations and input values as a touch panel arranged on the display unit 105 in an overlapped way. The display unit 105 and the operation controller 106 of the MFP 10 according to the present exemplary embodiment may be connected as a display apparatus and an operation apparatus, respectively, to the outside of the MFP 10.

The reading unit 111 reads documents. The reading unit 111 includes a pressing plate (not illustrated) for pressing the glass plate and a document and reads the document sheets one by one. The pressing plate is provided with an automatic document feeder (ADF) (not illustrated) that allows automatic and sequential reading of a plurality of document sheets. The reading unit 111 is connected to the reading controller 110. The CPU 101 controls the operation of the reading unit 111 via the reading controller 110.

The printing unit 113 forms (prints) an image on paper (a sheet) through an electrophotographic process. The printing unit 113 is connected to the printing controller 112. The CPU 101 controls the printing unit 113 via the printing controller 112. The printing unit 113 also prints an image on paper based on the image data included in a print job received via the NIC 117.

The host controller 114 is in charge of USB protocol control and intermediates in access to a USB device, such as a USB memory (not illustrated).

The MODEM 115 performs modulation and demodulation of a signal for fax communication. The MODEM 115 is connected to the NCU 116. The signal modulated by the MODEM 115 is sent out to the PSTN 30 via the NCU 116. The NCU 116 performs processing for transmitting and receiving dial signals.

The NIC 117 performs bi-directional data exchange with a mail or file server via a local area network (LAN). The NIC 117 also performs bi-directional data exchange with a web server. The NIC 117 may be a NIC for connection to a wired or wireless LAN.

While the MFP 10 according to the present exemplary embodiment includes the eMMC 109 as a storage, a hard disk drive (HDD) or a solid state drive (SSD) is also applicable. The CPU 101 controls the eMMC 109 via the eMMC host controller 108.

The CPU 101 of the MFP 10 generally controls the operation of the MFP 10 according to a control program in the MFP 10. More specifically, the CPU 101 runs an operating system (OS) for controlling the MFP 10 and runs driver programs for controlling hardware interfaces. Application programs allocated on the OS mutually operate to perform operations and control of functions desired by a user. The OS and various types of program stored in the ROM 102 are loaded from the ROM 102 into the RAM 103 and then run. For example, the MFP 10 carries out a copy function for reading a document and printing an image of the read document on paper. The MFP 10 also carries out a transmission function for reading a document and transmitting an image of the read document to a set destination. The MFP 10 also carries out a fax reception and print function for storing image data received by fax and printing the stored image data in response to a printing instruction from a user.

Figure 3:
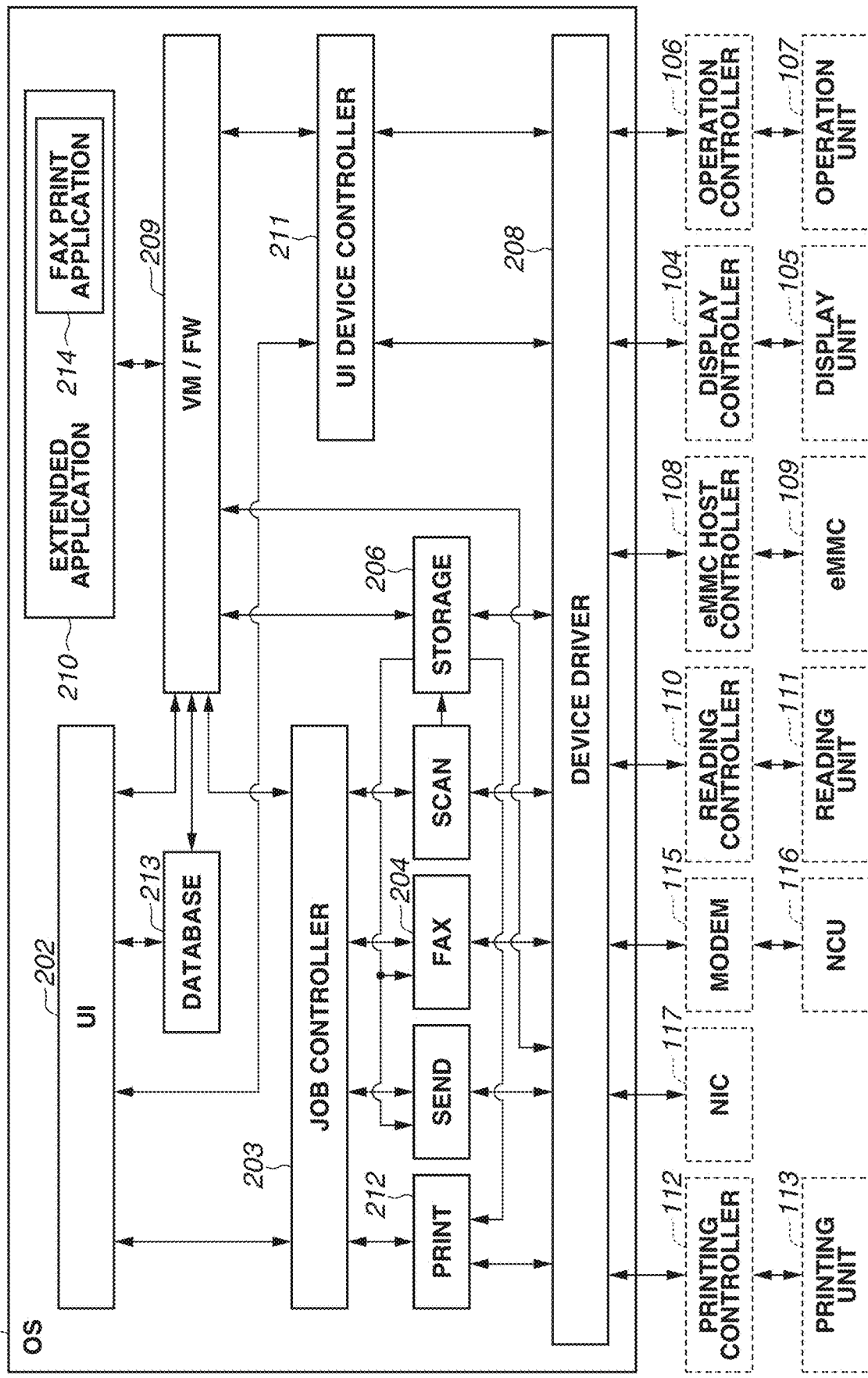
FIG. 3 illustrates an example of a software configuration of the MFP.

FIG. 3 illustrates an example of a software configuration of the MFP 10. In FIG. 3, the units illustrated with solid lines are software modules implemented when the CPU 101 runs the main program loaded in the RAM 103.

The operation of each module of the main program (described below) is managed and controlled by an operating system (OS) 201. The OS 201 is combined with a device driver unit 208. The device driver unit 208 intermediates in exchanges with hardware devices, such as the display controller 104, the operation controller 106, and the reading controller 110.

A user interface (UI) unit 202 provides a user with various kinds of information via the display unit 105 and the operation unit 107 and receives various instructions from a user. The UI unit 202 enables a user to change various settings for changing the operation of the MFP 10.

Various settings changed by the UI unit 202 are physically stored in the eMMC 109 via a database unit 213. A display language setting to be changed by the UI unit 202 is also one of the various settings.

A job controller unit 203 receives a job, such as copy, print, and fax jobs, and controls the run of the received job.

A storage unit 206 is a software module for physically storing, for example, image data in fax transmission and reception and application setting data requested by an extended application unit 210, in the eMMC 109 for management.

For example, if a fax unit 204 receives information indicating a fax reception request via the NCU 116 and the MODEM 115 in the MFP 10, the fax unit 204 requests the job controller unit 203 to generate a fax reception job. Upon reception of the fax reception job generation, fax reception processing (described below with reference to FIG. 8) is performed based on an instruction of the job controller unit 203. Then, image data received by fax is stored in the eMMC 109. The fax image data stored in the eMMC 109 is read by a print unit 212, the CPU 101 controls the printing unit 113 via the printing controller 112, and the printing unit 113 prints an image on paper based on the fax image data.

A fax reception job refers to processing for receiving image data from a transmission source through fax communication. The MFP 10 can also receive image data including a plurality of pages by running a job.

The MFP 10 includes a virtual machine/framework (VM/FW) 209. The extended application unit 210 stores a plurality of applications from programs stored in the eMMC 109 and described in a script language.

Example of available language systems include Java® and Lua as interpreters that interpret and run byte-codes.

The VM/FW unit 209 has a role of installing a program described in a script language or a predetermined high-level language in the extended application unit 210, or uninstalling a program from the extended application unit 210. At the same time, the eMMC 109 stores application status information including whether the installed application is enabled. If an archive where a plurality of pre-installed applications is compressed exists on the ROM 102, the VM/FW unit 209 can also install the archive in the extended application unit 210 while decompressing the archive as appropriate.

The VM/FW unit 209 also has a role of mediating between a function carried out by a program installed in the extended application unit 210 and an existing function. Then, when the CPU 101 operates the VM/FW unit 209, the CPU 101 receives a selection of a button displayed on the display unit 105, and interprets the contents of a corresponding application while loading the script language of the application into the RAM 103. The MFP 10 can easily carry out a function, such as the fax application 214, while maintaining the function attachment and detachment characteristics. Further, in response to a request from a program installed in the extended application unit 210, the VM/FW unit 209 refers to or changes various settings of the database unit 213.

A UI device controller 211 is software for the UI 202 and the extended application unit 210 to output various information to the display unit 105 with. The UI device controller 211 also intermediates in transmission of user operations on the operation unit 107 to the UI202 and the extended application unit 210.

Figure 6:
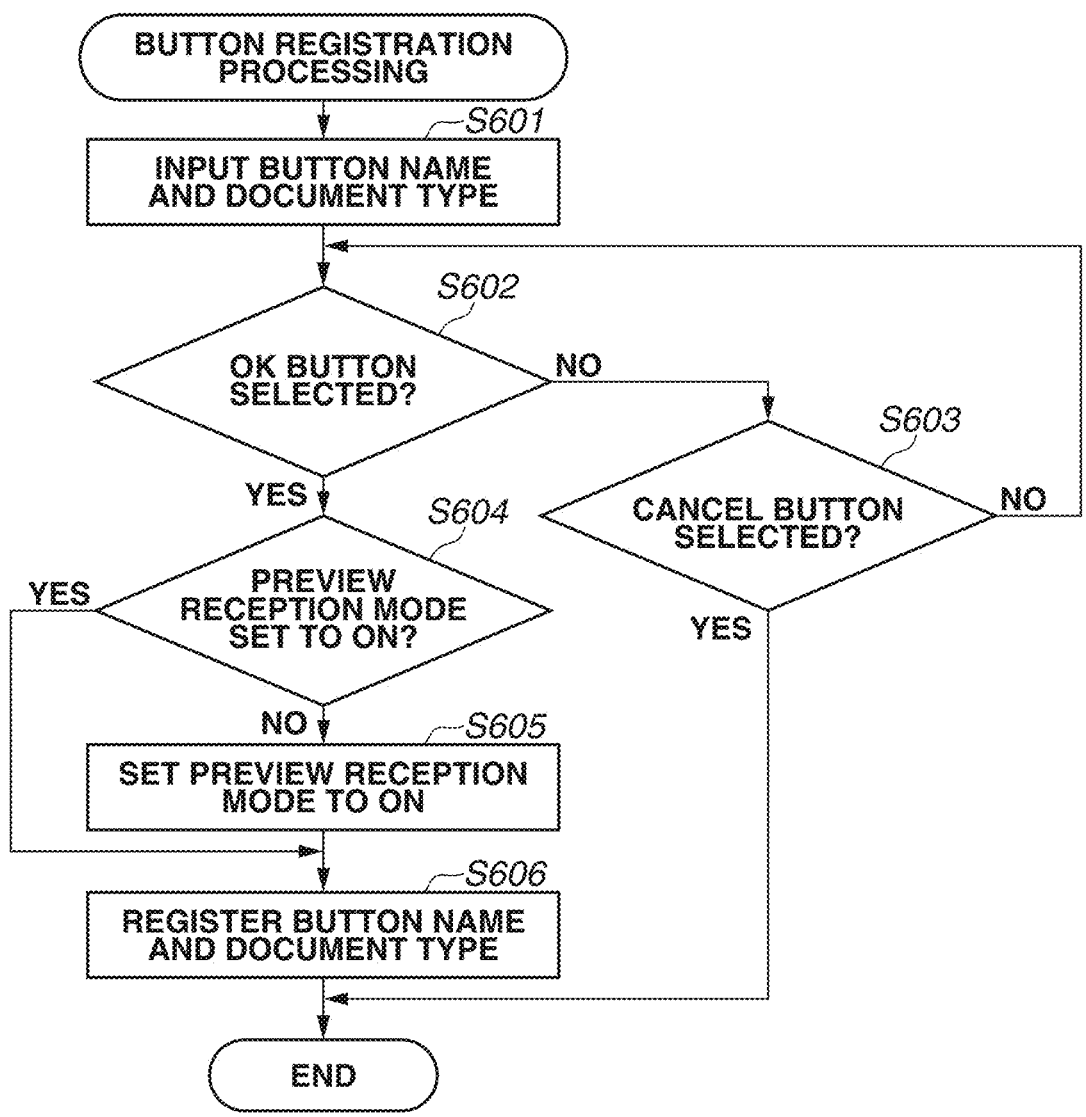
FIG. 6 is a flowchart illustrating button registration processing.

FIG. 6 is a flowchart illustrating an example of button registration processing. The CPU 101 loads the fax application 214 stored in the eMMC 109 into the RAM 103. Then, the operation of the VM/FW unit 209 by the CPU 101 allows the processing of the flowchart in FIG. 6 loaded into the RAM 103 to be interpreted. The flowchart in FIG. 6 is started by a user operating the operation unit 107 to select "Registering New Button" from the setting menu. Buttons are examples of objects and may be records in a list. The button registration can also be performed when the user accesses a web page provided by the MFP 10 by using a web browser.

In step S601, during the display of the button registration screen on the display unit 105, the CPU 101 receives a button name and a document type input by the user via the operation unit 107. An example of the button registration screen will be described below with reference to FIG. 5.

Figure 5:
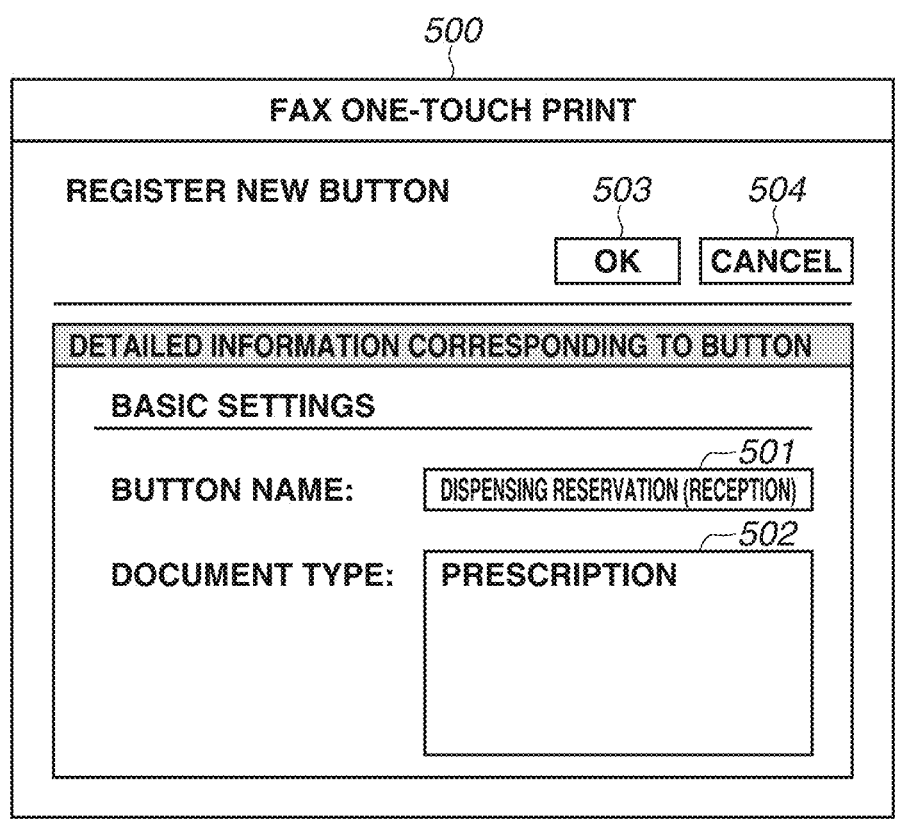
FIG. 5 illustrates an example of a button registration screen.

FIG. 5 illustrates an example of the button registration screen. A button registration screen 500 is an example of a screen displayed on the display unit 105 of the MFP 10.

An input field 501 is an object for setting the name of a button. A selection of the input field 501 by the user causes a software keyboard (not illustrated) to be displayed, allowing the user to input a button name.

An input field 502 is an object for registering the document type of fax image data subject to print processing to be performed by the printing unit 113 upon selection of the button to be registered. A selection of the input field 502 by the user causes the software keyboard (not illustrated) to appear, allowing the user to input the document type. The user may input a document type to the input field 502, as well as by a manual operation, by selecting a specific document type from among preset options. Further, a setting file where document types are registered may be read from the outside. One or more document types can be registered by using the input field 502.

An OK button 503 is an object for storing values input at the time of selection of this button, in association with the button. In the example in FIG. 5, when the OK button 503 is selected, the button information including the button name "Dispensing Reservation (Reception)" and the document type information "Prescription" are stored in the eMMC 109.

A Cancel button 504 is used to abandon the values input at the time of selection of this button, and close the button registration screen.

The description of the flowchart in FIG. 6 will be resumed. In step S602, the CPU 101 determines whether the OK button 503 is selected. If the CPU 101 determines that the OK button 503 is selected (YES in step S602), the processing proceeds to step S604. On the other hand, if the CPU 101 determines that the OK button 503 is not selected (NO in step S602), the processing proceeds to step 5603.

In step S603, the CPU 101 determines whether the Cancel button 504 is selected. If the CPU 101 determines that the Cancel button 504 is selected (YES in step S603), the processing is terminated. On the other hand, if the CPU 101 determine that the Cancel button 504 is not selected (NO in step S603), the processing returns to step 5602, and the CPU 101 repeats the subsequent processing.

In step 5604, the CPU 101 determines whether a preview reception mode is set to ON. In the preview reception mode, the MFP 10 displays a preview image of received data on the display unit 105, receives a user's selection via the operation unit 107, and then prints the image. In this mode, the MFP 10 does not automatically print fax reception image data without a user operation. The CPU 101 may receive the ON/OFF setting of the preview reception mode on the screen in FIG. 5 or another screen. If the CPU 101 determines that the preview reception mode is set to ON (YES in step S604), the processing proceeds to step 5606. On the other hand, if the CPU 101 determines that the mode is not set to ON (NO in step S604), the processing proceeds to step 5605.

In step S605, the CPU 101 sets the preview reception mode to ON. More specifically, the CPU 101 stores the setting value indicating that the preview reception mode is ON in the eMMC 109.

In step 5606, the CPU 101 stores the button name and the document type information input in step 5601, in the eMMC 109 in an associated way.

Figure 4:
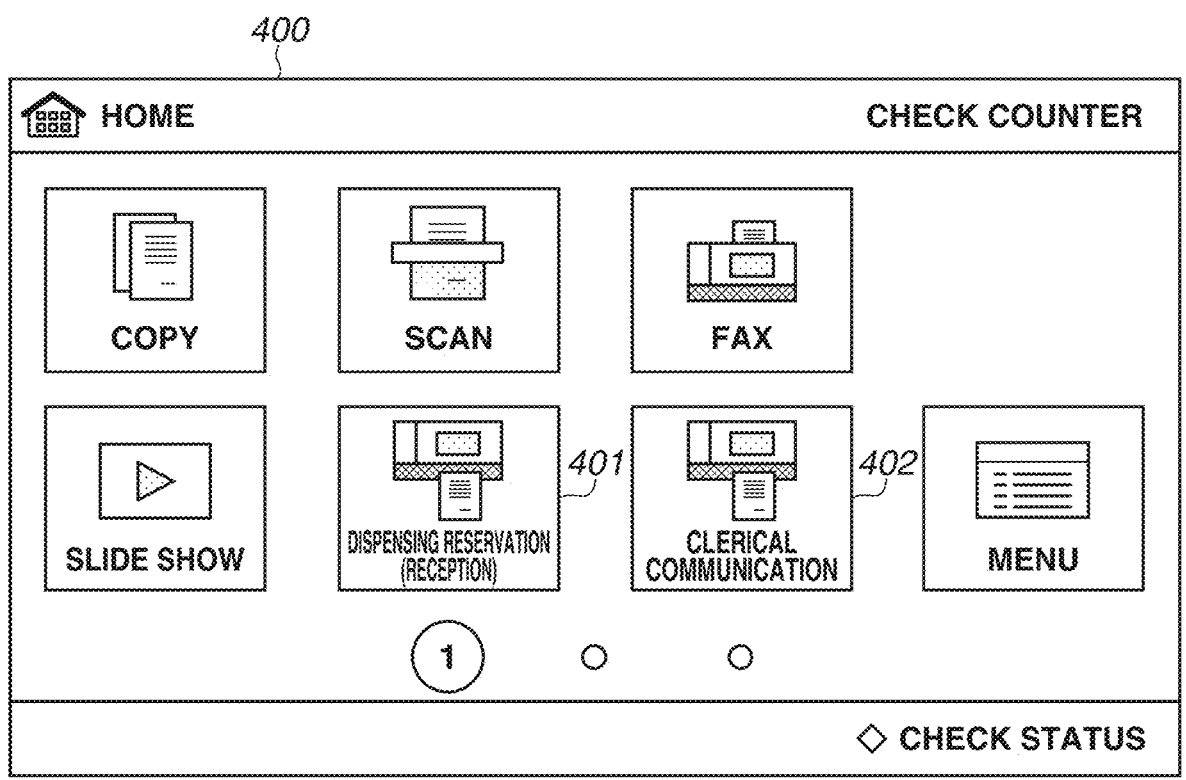
FIG. 4 illustrates an example of a HOME screen.

The registered button is displayed on a Home screen in FIG. 4. FIG. 4 illustrates an example of the Home screen displayed after the MFP 10 is activated.

A Home screen 400 is displayed on the display unit 105. The Home screen 400 displays a Copy button (copy object) with which the MFP 10 performs copy processing in which the reading unit 111 reads an image of a document to generate image data, and the printing unit 113 prints the image on paper based on the image data. The Home screen 400 also displays a Scan button (scan object) with which the MFP 10 performs scan processing in which the reading unit 111 reads an image of a document to generate image data. The Home screen 400 also displays a Fax button (fax object) with which the MFP 10 performs fax transmission processing in which the reading unit 111 reads an image of a document to generate image data, and the NCU 116 transmits the generated image data by fax. The Home screen 400 also displays menu buttons for setting various functions.

The Home screen 400 further displays a "Dispensing Reservation (Reception)" button 401 as the one-touch button generated in the flowchart in FIG. 6 and a "Clerical Communication" button 402 generated in the same flowchart. If the user selects the button 401 or 402, the printing unit 113 prints fax reception data corresponding to the document type based on the document type information pre-registered in association with the button. For example, if the "Dispensing Reservation (Reception)" button 401 is selected, the CPU 101 instructs the printing unit 113 to print the image data corresponding to the document type information "Prescription" set in the button registration screen 500 in FIG. 5. This processing will be described in detail below with reference to FIG. 10.

Character strings "Dispensing Reservation (Reception)" and "Clerical Communication" displayed in the buttons 401 and 402 are the button names input in the button registration screen 500 in FIG. 5, respectively.

A selection of the button 401 or 402 causes fax one-touch print processing (described in detail below with reference to FIG. 10) to be performed.

Figure 8:
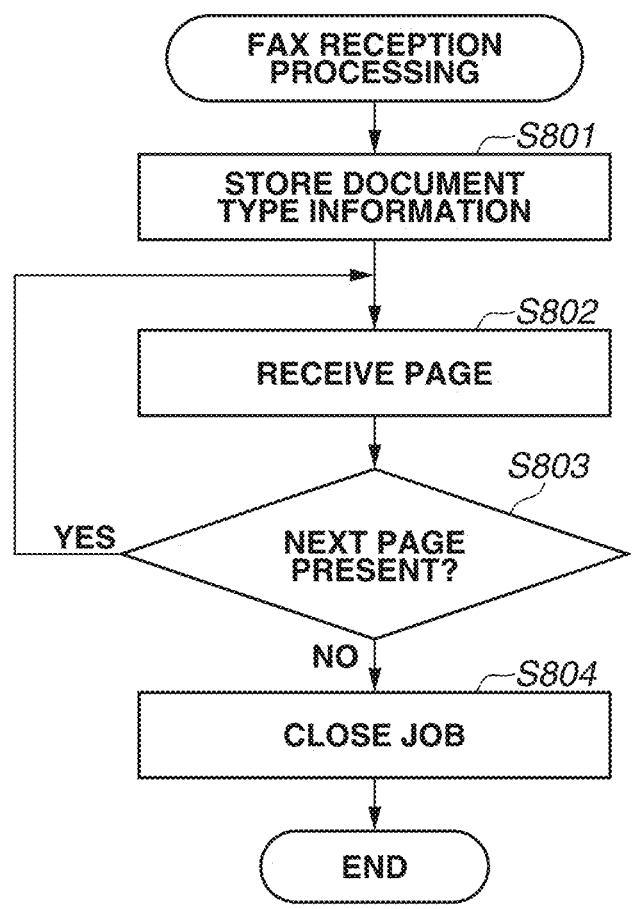
FIG. 8 is a flowchart illustrating fax reception processing.

FIG. 8 is a flowchart illustrating an example of processing for storing fax reception data. The processing of the flowchart in FIG. 8 is performed by the CPU 101 loading a program stored in the ROM 102 into the RAM 103 and then running the program. The flowchart in FIG. 8 is automatically started when the MFP 10 receives a fax reception request from the MFP 21 or another external apparatus via the PSTN 30.

In step S801, when the CPU 101 receives image data by fax, the CPU 101 stores the received document type information in the eMMC 109. A fax image data reception sequence will be described below with reference to FIG. 14.

In step S802, the CPU 101 stores the image data received by fax in facsimile procedures, in the eMMC 109. The image data is associated with the received document type information and then is stored in the eMMC 109. The document type information may be stored in association with each piece of the received image data or in association with each fax reception job.

In step S803, the CPU 101 determines whether a notification about the presence of image data corresponding to the next page is received in the facsimile procedures. If the CPU 101 determines that the notification is received (YES in step S803), the processing returns to step 5802, and the CPU 101 repeats the subsequent processing.

In step S804, the CPU 101 completes the fax reception job. The CPU 101 does not delete the fax reception job from the eMMC 109 but has the job continuously stored in the eMMC 109. Each fax reception job is stored with a number assigned in order of storage.

Figure 9:
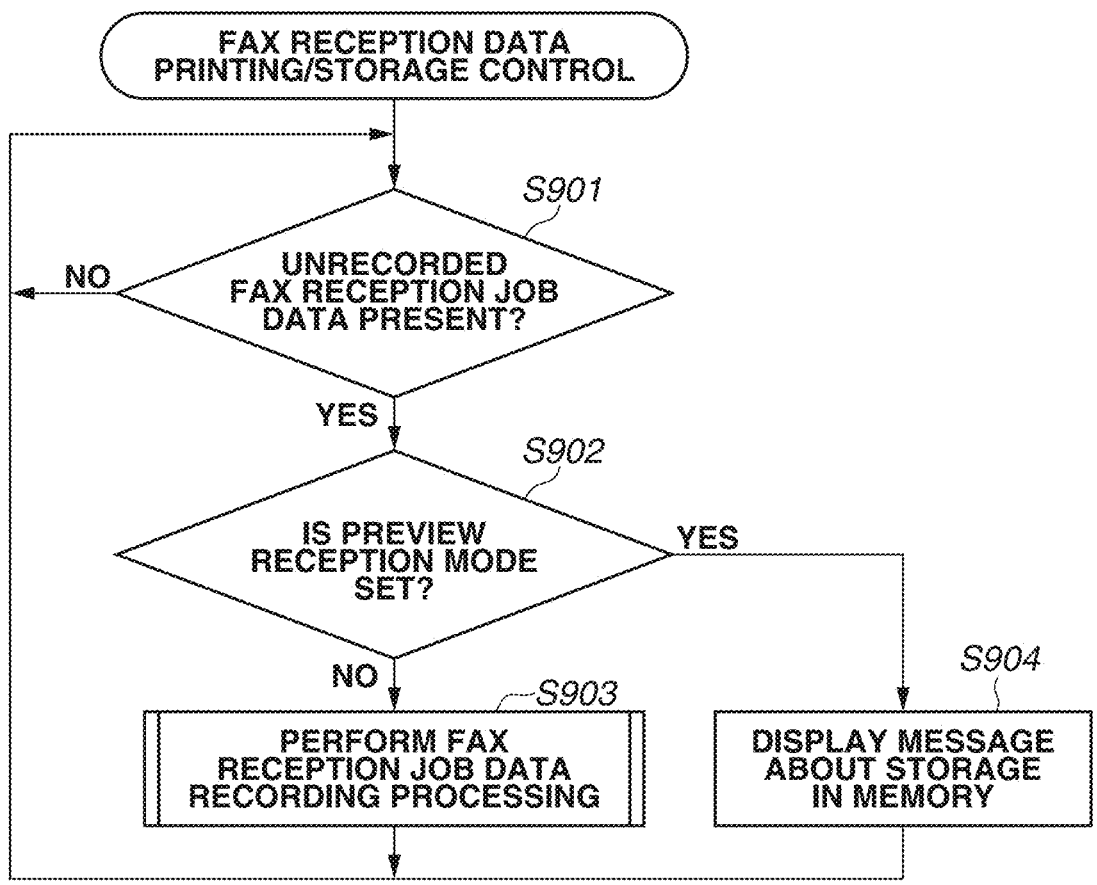
FIG. 9 is a flowchart illustrating fax reception image recording/holding control.

FIG. 9 is a flowchart illustrating an example of control processing for printing and recording of fax reception job data. The processing of the flowchart in FIG. 9 is carried out by the CPU 101 loading a program stored in the ROM 102 into the RAM 103 and then running the program. The flowchart in FIG. 9 may be started simultaneously with an activation of the MFP 10, and constantly monitors the status of fax reception jobs at regular intervals.

In step S901, the CPU 101 determines whether there is fax reception job data that has not yet been recorded. If the CPU 101 determines that there is fax reception job data that has not yet been recorded (YES in step S901), the processing proceeds to step S902. On the other hand, If the CPU 101 determines that there is no fax reception job data that has not yet been recorded (NO in step S901), the processing returns to step 5901.

In step 5902, the CPU 101 determines whether the MFP 10 is set to the preview reception mode. If the CPU 101 determines that the MFP 10 is set to the preview reception mode (YES in step S902), the processing proceeds to step 5904. On the other hand, if the CPU 101 determines that the MFP 10 is not set to the preview reception mode (NO in step S902), the processing proceeds to step 5903. In step 5904, the CPU 101 instructs the display unit 105 to display a message indicating that the job data is currently stored in memory. The display unit 105 displays character strings, such as "Stored in Memory" or "Received in Memory", notifying the user that there is image data received and then stored in memory, respectively.

In step 5903, the CPU 101 performs print processing for fax reception job data. The print processing for fax reception job data will be described below with reference to FIG. 7.

Figure 7:
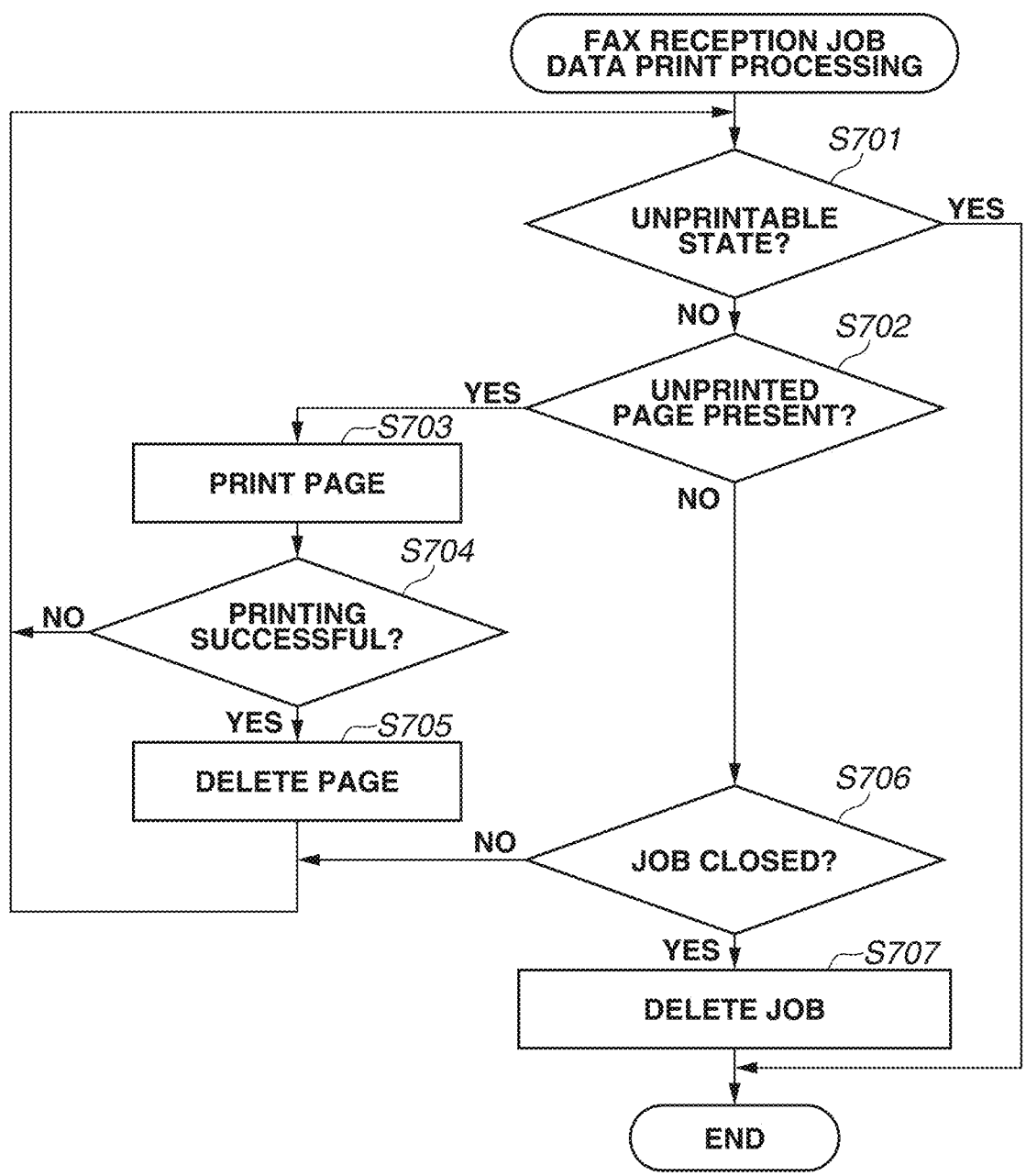
FIG. 7 is a flowchart illustrating processing for recording data about a fax reception job.

FIG. 7 is a flowchart illustrating an example of print processing for fax reception job data. The processing of the flowchart in FIG. 7 is performed by the CPU 101 loading a program stored in the ROM 102 into the RAM 103 and then running the program.

In step 5701, the CPU 101 determines whether the MFP 10 is in an unprintable state. More specifically, for example, the CPU 101 determines whether a recording material, such as toner, remains, whether a recording paper jam is present, or whether no recording paper remains. If the CPU 101 determines that the MFP 10 is in the unprintable state (YES in step S701), the processing exits from the flowchart. On the other hand, if the CPU 101 determines that the MFP 10 is not in the unprintable state (NO in step S701), the processing proceeds to step 5702.

In step 5702, the CPU 101 determines whether there is a page of fax reception data that has not yet been printed. If the CPU 101 determines that there is a page of fax reception data that has not yet been printed (YES in step S702), the processing proceeds to step 5703. On the other hand, when the CPU 101 determines that there is no page of fax reception data that has not yet been printed (NO in step S702), the processing proceeds to step 5706.

In step 5703, the CPU 101 controls the printing unit 113 to print an image on paper based on the received image data (page).

In step 5704, the CPU 101 determines whether printing is successfully completed in step 5703. If the CPU 101 determines that printing is successfully completed (YES in step S704), the processing proceeds to step 5705. On the other hand, if the CPU 101 determines that printing is not successfully completed (NO in step S704), the processing returns to step 5701. In step 5701, the CPU 101 determines whether the MFP 10 is in the unprintable state again.

In step 5705, the CPU 101 deletes the image data (page) recorded in the eMMC 109.

In step 5706, the CPU 101 determines whether the fax reception job is completed. If the CPU 101 determines that the job is completed (YES in step S706), the processing proceeds to step 5707. On the other hand, if the CPU 101 determines that the job is not completed (NO in step S706), the processing returns to step 5701, and the CPU 101 repeats the subsequent processing.

In step 5707, the CPU 101 deletes the fax reception job from the eMMC 109 and then completes the processing.

Processing in fax one-touch print processing will be described below.

Figure 10:
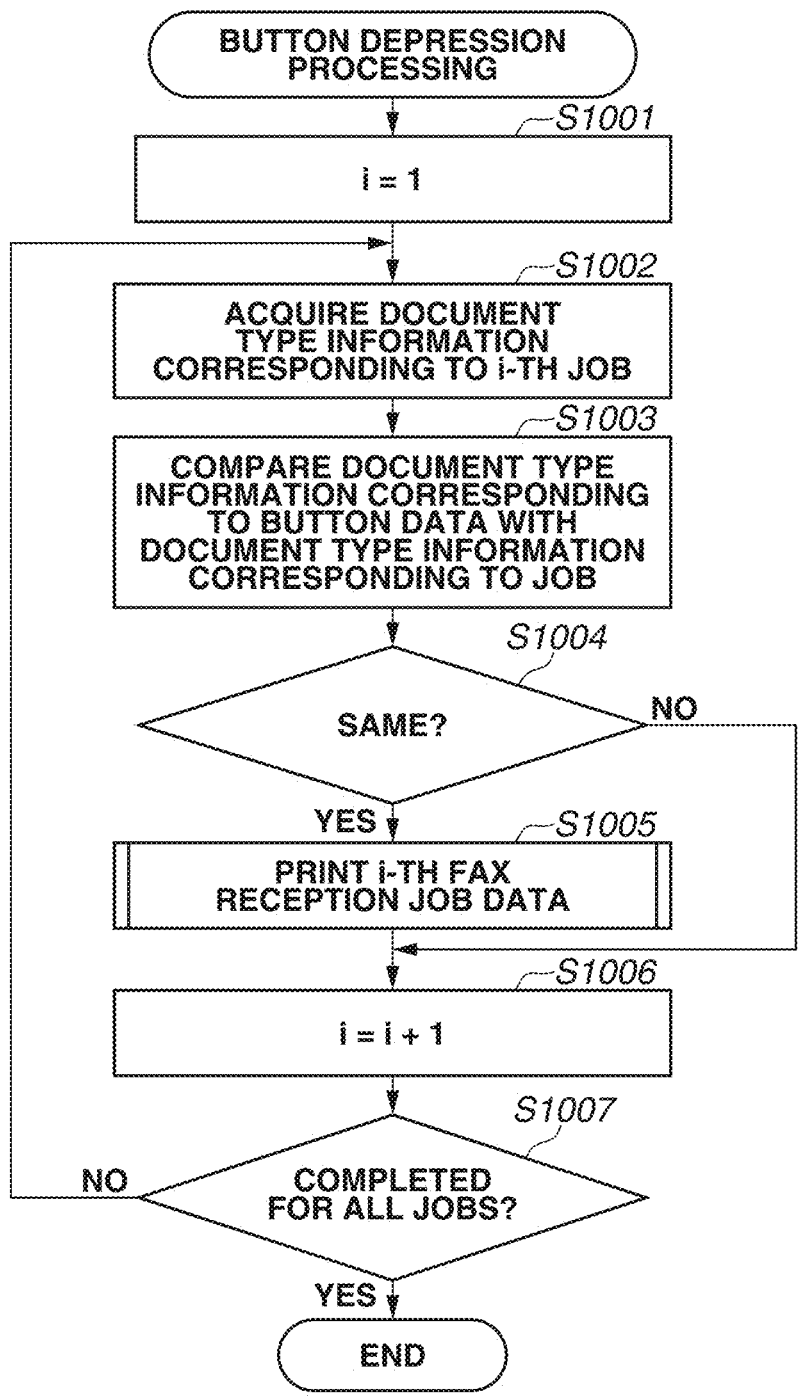
FIG. 10 is a flowchart illustrating processing in button depression.

FIG. 10 is a flowchart illustrating an example of the fax one-touch print processing. The CPU 101 reads the fax application 214 stored in the eMMC 109 into the RAM 103. The operation of the VM/FW unit 209 by the CPU 101 allows the processing of the flowchart in FIG. 9 loaded into the RAM 103 to be interpreted. The processing in FIG. 10 is started by a one-touch button, such as the button 401 or 402, being selected.

In step S1001, the CPU 101 substitutes 1 into a variable i.

In step S1002, the CPU 101 acquires the document type information about the i-th job in ascending order of the assigned number of the fax reception jobs. More specifically, the CPU 101 reads the document type information stored in the eMMC 109 in step S801.

In step S1003, the CPU 101 compares the document type information acquired in step 51002 with the document type information registered in association with the button selected to start this flowchart.

In step S1004, the CPU 101 determines whether the document type information acquired in step S1002 is the same as the document type information registered in association with the button.

Thus, the CPU 101 searches for image data corresponding to the same document type information as that registered in association with the button.

In step S1005, the CPU 101 performs the print processing for the data about the i-th fax reception job. The print processing for the fax reception job data is the processing described above with reference to FIG. 7.

In step S1006, the CPU 101 substitutes a value of i+1 to the variable i. In step S1007, the CPU 101 determines whether the comparison processing in step S1003 is completed for all of the fax reception jobs stored in the eMMC 109. If the CPU 101 determines that the comparison processing is completed for all of the fax reception jobs (YES in step S1007), the processing exits from the flowchart for the button depression. On the other hand, if the CPU 101 determines that the compression processing is not completed (NO in step S1007), the processing returns to step 51002, and the CPU 101 repeats the subsequent processing.

Figure 13:
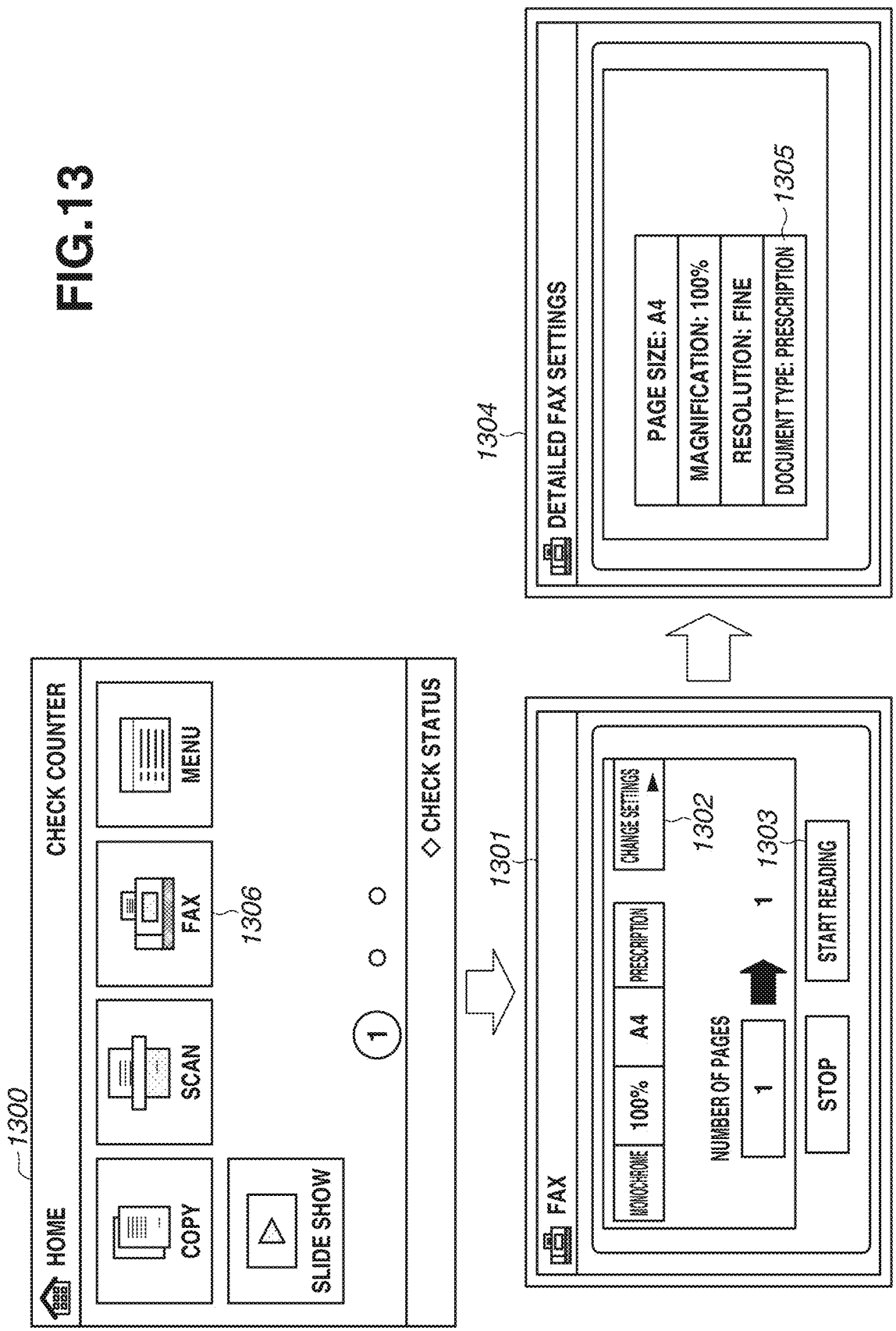
FIG. 13 illustrates settings in fax transmission.

FIG. 13 illustrates a Home screen displayed on the MFP 21. A Home screen 1300 displayed on the display unit 105 is used to issue an instruction for carrying out each function of the MFP 21. If a Fax 1306 is pressed, a fax setting screen 1301 appears.

The fax setting screen 1301 displays current setting values, such as the read settings and read size for transmission. If a Start Reading button 1303 is pressed, the CPU 101 starts reading based on the current settings. A Change Settings button 1302 is pressed to change detailed settings included in the read settings.

A Details Setting screen 1304 appears if a Change Settings button 1012 in the fax setting screen 1301 is pressed. The Details Setting screen 1304 allows the user to change the current settings, such as the read settings and read size for transmission. The user can set the document type, such as orders (e.g., prescriptions) and clerical notes, by operating a Set Type button 1305.

Figure 14:
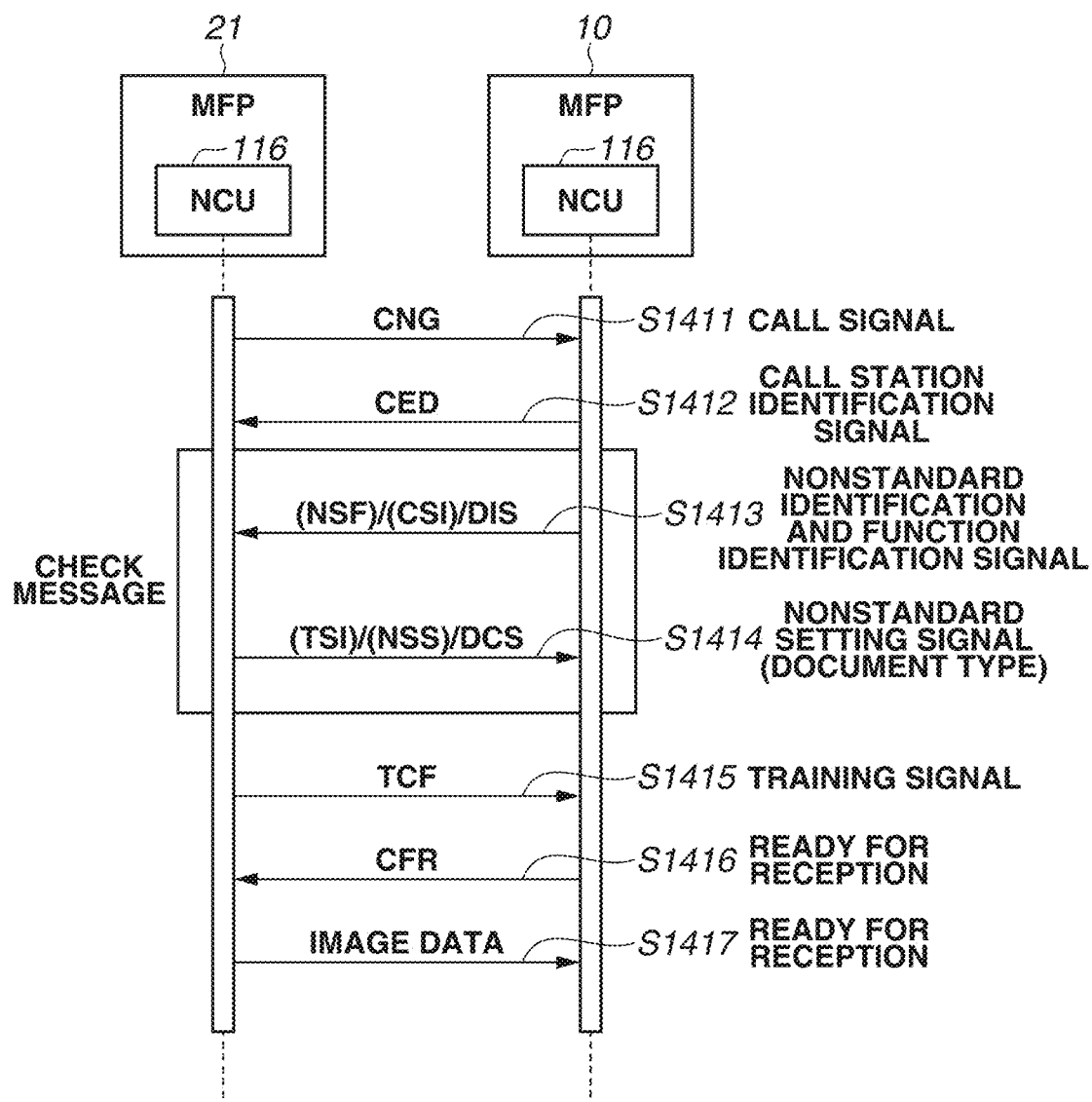
FIG. 14 is a sequence diagram illustrating a signal notification method for document type information.

FIG. 14 is a sequence diagram illustrating signal responses and exchanges when the MFPs 10 and 21 perform fax transmission and reception. In step 51411, the MFP 21 transmits a call signal to the MFP 10 to capture a line with the MFP 10. In step S1412, the MFP 10 transmits a signal to the MFP 21 to notify that the MFP 10 is in a receivable state. In step S1413, the MFP 10 transmits a signal to the MFP 21 to notify the MFP 21 of the receivable settings and capabilities. In step S1414, based on the signal received in step S1413, the MFP 21 transmits a signal to the MFP 10 to notify the MFP 10 of the settings and capabilities to be transmitted. In this case, information indicating the document type including the document type information set with the Set Type button 1305 is added to the signal to be transmitted, as document type information. In step S1415, the MFP 21 adjusts the reception status of the modem in the MFP 10. In step 51416, the MFP 10 issues an instruction for the reception status of the modem in the MFP 21. In step S1417, the MFP 21 transmits the image data to the MFP 10. The MFP 10 associates the document type information received in step S1414 and the image data received in step S1417 with each other and then the document type information and the image data in the eMMC 109 to allow for these pieces of data being printed in the processing in FIG. 10.

The above-described configuration enables collective printing of only the fax reception images transmitted from a specific transmission source, at the touch of a button.

While the present exemplary embodiment has been described above on the premise that the fax application 214 is an extended application, the fax application 214 may be stored in the ROM 102 at factory shipment.

While in the present exemplary embodiment, the example has been described above where the preview reception mode is set to ON when registering a one-touch button in step 5605, some embodiments are not limited to the example. For example, the registration of a one-touch button may be received only when the preview reception mode is set to ON.

To set the preview reception mode to ON when registering a one-touch button, the CPU 101 may display a confirmation screen for notifying the user that the preview reception mode can be set to ON.

According to the present exemplary embodiment, the CPU 101 can set the preview reception mode to ON to print the image data received by fax by selection of a one-touch button (the object). However, the CPU 101 may determine the document type information upon reception by using a dedicated reception setting to allow immediate printing of only fax images corresponding to specific document type information.

A second exemplary embodiment will be described. In the first exemplary embodiment, the example has been described above where the determination of the document type is set based on the specification by the user on the transmission side. In the second exemplary embodiment, an example will be described where an apparatus on the reception side determines a document type through optical character recognition (OCR). Descriptions of similar processing to that in the first exemplary embodiment will be omitted.

Figure 11:
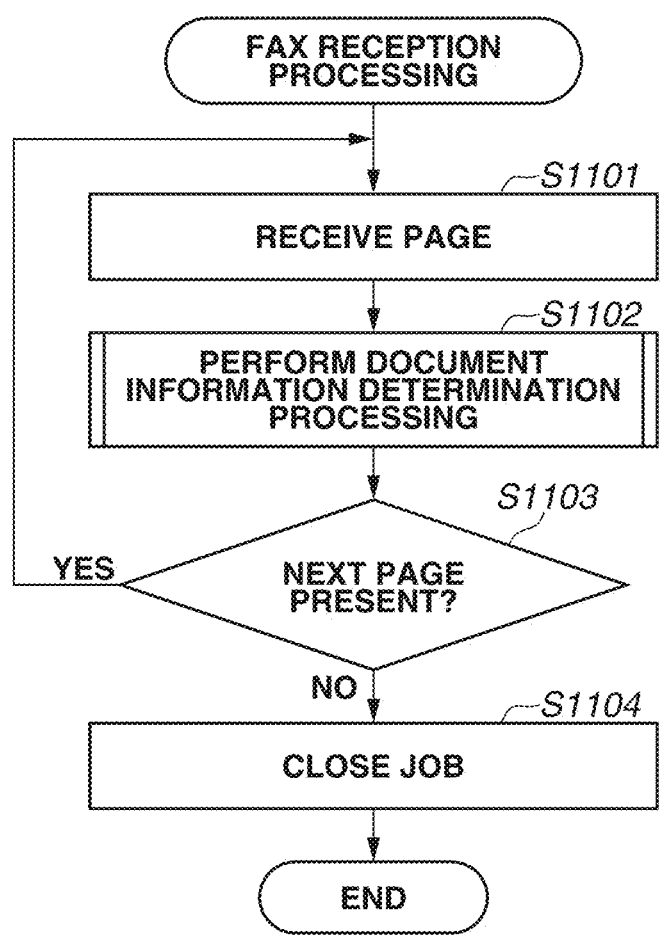
FIG. 11 is a flowchart illustrating fax reception processing for automatically determining document type information.

The second exemplary embodiment performs processing in FIG. 11 instead of the processing in FIG. 8.

FIG. 11 is a flowchart illustrating fax reception processing for automatically determining document type information in an MFP 10. The processing of the flowchart in FIG. 11 is performed by a CPU 101 loading a program stored in a ROM 102 into a RAM 103 and then running the program.

In step S1101, the CPU 101 stores image data received by fax in facsimile procedures in an eMMC 109.

In step S1102, the CPU 101 performs document type information determination processing (described below with reference to FIG. 12). In step S1103, the CPU 101 determines whether a notification about the presence of image data corresponding to the next page is received in the facsimile procedures. If the CPU 101 determines that the notification is received (YES in step S1103), the processing returns to step 51101, and the CPU 101 repeats the subsequent processing. In step 51104, the CPU 101 completes the fax reception job. The CPU 101 herein does not delete the fax reception job from the eMMC 109 but has the job continuously stored in the eMMC 109. Each fax reception job is stored with a number assigned in order of storage.

Figure 12:
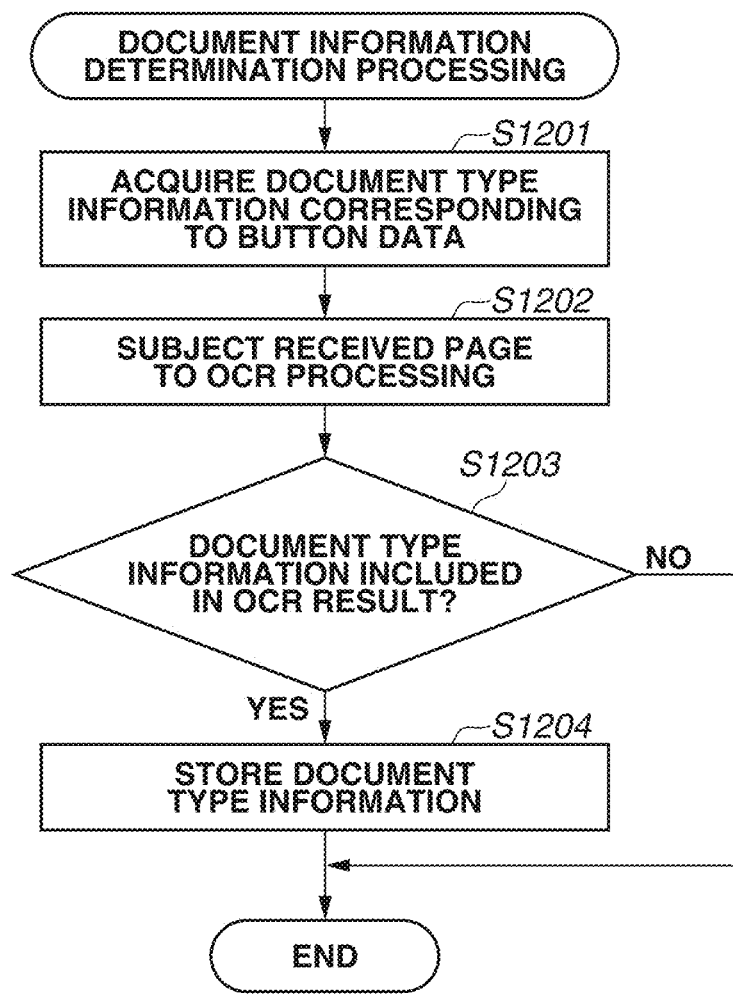
FIG. 12 is a flowchart illustrating document type information determination processing by optical character recognition (OCR).

FIG. 12 is a flowchart illustrating document type information determination processing through the OCR. The processing of the flowchart in FIG. 12 is performed by the CPU 101 loading a program stored in the ROM 102 into the RAM 103 and then running the program.

In step S1201, the CPU 101 reads the document type information corresponding to button data stored in step 5606 from the eMMC 109.

In step 51202, the CPU 101 applies the OCR processing to the received page and, as a result of the processing, the CPU 101 obtains text information in the image data. In step S1203, the CPU 101 compares the text information extracted in the OCR processing with the document type information corresponding to the button data to determine whether there is a button corresponding to the same information. The determination may be performed on a partial matching or perfect matching basis. The user may be able to set a condition under which the CPU 101 performs the above-described determination.

If there is a button corresponding to the same information (YES in step S1203), the processing proceeds to step 51204. In step 51204, the CPU 101 associates the document type information registered in association with the button in the eMMC 109, with the image data received in step S1101 and then stores the document type information in association with the image data.

While in the present exemplary embodiment, the example has been described above where the OCR processing is performed by the MFP 10 that has received the fax data, the OCR processing may be performed by the MFP 21 that transmits the fax data. For example, if the fax 22 has only the fax function without the OCR function, the OCR processing may be performed by the apparatus on the reception side.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc TM (BD)), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-159276, which was filed on Oct. 3, 2022 and which is hereby incorporated by reference herein in its entirety.

What is claimed is:

1. An image forming apparatus comprising:
a user interface that receives sets of characters, wherein each set of characters, of the sets of characters, indicates a respective type of image data, and wherein each type of image data is associated with a respective object of a plurality of objects;
a display that displays the plurality of objects;
a communicator that receives pieces of image data by a facsimile communication;
a printer; and
a controller that is configured to
register each set of characters, of the sets of characters, with the respective object that is associated with the respective type of image data that is indicated by the set of characters,
perform character recognition processing on the pieces of image data received by the communicator to extract characters that are included in the pieces of image data,
determine whether the extracted characters are included in at least one of the sets of characters,
in a case where the extracted characters are included in at least one of the sets of characters, register the pieces of image data as being the respective type of image data indicated by the at least one of the sets of characters,
in a case where the extracted characters are not included in any of the sets of characters that are registered for their respective objects, not register the pieces of image data as being any of the types of image data, and
in accordance with selection of a selected object of the plurality of objects via the user interface, control the printer to perform printing of the pieces of image data registered as being the respective type of image data associated with the selected object.

2. The image forming apparatus according to claim 1, wherein the user interface further receives a respective object name for each of the plurality of objects, and wherein the display displays the plurality of objects with the respective object names.

3. The image forming apparatus according to claim 1, wherein the display displays the plurality of objects on a screen for displaying a copy object of a copy function for reading an image of a document and printing the read image of the document.

4. The image forming apparatus according to claim 1, wherein the display displays the plurality of objects on a screen for displaying a facsimile object of a transmission function for reading an image of a document and transmitting, by facsimile communication, the read image of the document.

5. The image forming apparatus according to claim 1, wherein the controller is further configured to search, in accordance with the selection of the selected object via the user interface, for the pieces of image data registered as being the respective type of image data associated with the selected object from among the pieces of image data received by the communicator.

6. The image forming apparatus according to claim 1, wherein the controller is further configured to search, in accordance with the selection of the selected object by the user interface, for pieces of image data including characters that are included in the respective set of characters that is registered with the selected object from among the pieces of image data received by the communicator, and wherein the controller is further configured to cause the printer to perform printing of image data found in the search.

7. A method for controlling an image forming apparatus, the method comprising:
receiving, via a user interface, sets of characters for objects, wherein each set of characters, of the sets of characters, indicates a respective type of image data, and wherein each type of image data is associated with a respective object of a plurality of objects;
registering each set of characters, of the sets of characters, with the respective object, of the plurality of objects, that is associated with the respective type of image data that is indicated by the set of characters;
displaying the plurality of objects;
receiving pieces of image data by facsimile communication;
performing character recognition processing on the pieces of received image data to extract characters that are included in the pieces of image data;
determining whether the extracted characters are included in at least one of the sets of characters;
in a case where the extracted characters are included in at least one of the sets of characters, registering the pieces of image data as being the respective type of image data indicated by the at least one of the sets of characters;
in a case where the extracted characters are not included in any of the sets of characters that are registered for their respective objects, not registering the pieces of image data as being any of the types of image data; and
causing, in accordance with selection of a selected object of the plurality of objects via the user interface, a printer to perform printing of the pieces of image data registered as being the respective type of image data associated with the selected object.

8. A non-transitory computer-readable storage medium storing a computer-executable instructions for causing a computer to execute a method for controlling an image forming apparatus, the method comprising:
receiving, via a user interface, sets of characters for objects, wherein each set of characters, of the sets of characters, indicates a respective type of image data, and wherein each type of image data is associated with a respective object of a plurality of objects;
registering each set of characters, of the sets of characters, with the respective object, of the plurality of objects, that is associated with the respective type of image data that is indicated by the set of characters;
displaying the plurality of objects;
receiving pieces of image data by facsimile communication;
performing character recognition processing on the pieces of received image data to extract characters that are included in the pieces of image data;
determining whether the extracted characters are included in at least one of the sets of characters;
in a case where the extracted characters are included in at least one of the sets of characters, registering the pieces of image data as being the respective type of image data indicated by the at least one of the sets of characters;
in a case where the extracted characters are not included in any of the sets of characters that are registered for their respective objects, not registering the pieces of image data as being any of the types of image data; and
causing, in accordance with selection of a selected object of the plurality of objects via the user interface, a printer to perform printing of the pieces of image data registered as being the respective type of image data associated with the selected object.

* * * * *